United States Patent [19]

Kalish

[11] Patent Number: 4,914,300

[45] Date of Patent: Apr. 3, 1990

[54] SCINTILLATION SPECTROMETER

[76] Inventor: Yehoshua Kalish, 27 Ha'aztmaut St., Hod HaSharon, Israel

[21] Appl. No.: 177,111

[22] Filed: Apr. 4, 1988

[30] Foreign Application Priority Data

Sep. 9, 1987 [IL] Israel .................................. 83847

[51] Int. Cl.⁴ .............................................. G01T 1/20
[52] U.S. Cl. .................................... 250/369; 250/362
[58] Field of Search ................................. 250/362, 369

[56] References Cited

U.S. PATENT DOCUMENTS 4,049,966 9/1977 Luitwieler, Jr. ..................... 250/369
4,651,006 3/1987 Valenta ............................... 250/369

OTHER PUBLICATIONS

Noakes et al., "Pulse Shape Liquid Scintillation Counting for Beta, Gamma, or Beta-Gamma Counting", Liquid Scintillation Counting-Recent Applications & Development, vol. 1, Physical Aspects, pp. 105–116.

Primary Examiner—Janice A. Howell
Attorney, Agent, or Firm—Felfe & Lynch

[57] ABSTRACT

The invention provides an alpha-beta-gamma scintillation spectrometer of the type having a scintillation crystal with two photomultiplier tubes coupled thereto comprising an inhibition circuit which inhibits pulses from passing to a multichannel analyzer of the spectrometer for a period of about 1 to about 20 msec following the detection of a slow pulse, whereby delayed light emission background impulses originating from the crystal and not from a sample are not counted and only pulses in coincidence are registered and stored thereafter.

7 Claims, 3 Drawing Sheets

SCINTILLATION SPECTROMETER

BACKGROUND OF THE INVENTION

1. FIELD OF THE INVENTION

The present invention concerns scintillation counters. More particularly the present invention is directed to alpha-beta-gamma scintillation spectrometers for the measurement of radioactive samples.

2. DESCRIPTION OF THE PRIOR ART

The core of an alpha-beta-gamma scintillation spectrometer comprises a cylindrical NaI(Tl) crystal with two photomultiplier tubes coupled to it and at the center of this crystal, perpendicular to its major axis, there is a cylindrical cavity covered with quartz. When a sample containing a beat emitting isotope is to be measured, it is dissolved in a liquid scintillator and the vial containing the radioactive liquid scintillator is loaded into this cavity. The light emitted from a liquid scintillator when a beta particle interacts with it is piped through the NaI(Tl) crystal to the two photomultiplier tubes. Only when the pulses from both of the p.m. tubes are in coincidence, and only when these are fast pulses, as determined by pulse shape analyzers, the signal is stored in a multichannel analyzer. The NaI(Tl) crystal serves not only as a light pipe but also as an anti-coincidence shield for reducing background counting rate. When a gamma, or a cosmic ray, interacts both with the liquid scintillator and the NaI(Tl) crystal, the "false" pulse is not counted. Such background pulses are rejected by pulse-shape discriminators. The light emitted from the liquid scintillator and the NaI(Tl) crystal reaches the same p.m. tubes. However, the pulse shape of a pulse which originates in the organic liquid scintillator differs from that which originates in the inorganic NaI(Tl) crystal; whereas the decay constant of a light pulse from the liquid scintillator is about 3 nsec, the decay constant of a light pulse from the NaI(Tl) crystal is about 230 nsec. By using pulse-shape discriminators it is possible to ascertain the origin of the pulse.

Alpha emitters are measured in the same way as beta emitters. When a gamma emitter is to be measured the NaI(Tl) crystal serves as a conventional scintillation detector.

The alpha-beta-gamma scintillation spectrometer is a universal spectrometer with which any kind of radioactive isotope can be measured. However, it was found out that this spectrometer is not suitable for the measurement of samples which contain low activities of tritium. Whereas the background in the tritium window with conventional liquid scintillation spectrometers is about 20 counts per minute, the background in this window with an alpha-beta-gamma scintillation spectrometer is over 200 counts per minute. It should be realized that this is quite a serious disadvantage as tritium is widely used, inter alia, in biological and medical laboratories, being the only radioactive tracer of hydrogen, the origin of this high background counting rate was not known up to now, nor was it known how this problem could be solved so as to make alpha-beta-gamma spectrometers useful in measuring low level tritium samples.

SUMMARY OF THE INVENTION

It has now been found that by using electronic circuits which inhibit pulses from passing to the multichannel analyzer for a period of about 1 to about 20 msec following the detection of a slow pulse, the problem of high background in the tritium window is solved. According to this invention the use of such electronic circuits whenever tritium samples are to be measured, makes conventional alpha-beta-gamma spectrometers useful in measuring low level tritium activities. It has been now discovered that the origin of the background pulses is due to delayed light emission from the NaI(Tl) crystal after background gamma photons interact with it. For tritium to be measured efficiently by a liquid scintillation spectrometer, and by an alpha-beta-gamma spectrometer, the detector must have a high efficiency in measuring down to about 3 keV electrons (the energies of beta particles from tritium are in the range of 0–18 keV). When a 300 keV gamma photon, for example, is fully absorbed in a NaI(Tl) crystal the light signal generated is much larger than that generated by a 3 keV beta electron interacting with the liquid scintillator. Taking into consideration that the scintillation conversion efficiency of liquid scintillators is only about 20% of that of NaI(Tl) and the 100 ratio in energies—3 keV as compared with 300 keV—it is realized that the light output from the NaI(Tl) is about 500 times greater than that from the liquid scintillator, in the above mentioned example. Such large signals do not contribute to the background in the tritium window because (1) their size is far above the tritium window and (2) the pulses are discriminated by the pulse-shape analyzers. However, it should be realized that although the main component of the light emitted from a NaI(Tl) crystal decays with a time constant of 230 nsec, other components of the light decay with much longer time constants. Now, let us examine what happens when one measures the background counting rate in the tritium window with an alpha-beta-gamma scintillation spectrometer. When a background gamma photon interacts with the NaI(Tl) crystal the pulses generated from the photomultiplier tubes are outside of the tritium window and are also rejected by the pulse-shape discriminators, as explained above. However, a few microseconds later, when the electronic system is ready to receive new pulses, the 'after glow' from the NaI(Tl) crystal, to which both of the photomultipliers are exposed to, is strong enough to generate a high rate of small pulses from each of the photomultiplier tubes. When a couple of such small pulses, one from each p.m. tube, are in coincidence (within about 20 nsec) a background count is registered in the tritium window. As a result of the interaction of a gamma photon with the NaI(Tl) crystal, one or more such background counts in the tritium window might result. According to this invention, after an interaction of a background gamma photon with the NaI(Tl) crystal which produces a slow pulse is detected by the pulse shape discriminators, monostable electronic circuits—or computer controlled electronic timers, or any other suitable electronic circuits—inhibit the passage of all pulses from both of the p.m. tubes for a period of about 1–20 preferably about 5–15 msec. According to this invention after an interaction of a gamma photon with the NaI(Tl) crystal the counting system is not ready to accept new pulses just after a few microseconds, but only after the over 100 to 2000 time longer period of 1 to 20 msec. After this long time interval the light level of 'after glow' which irradiates the two p.m. tubes is very much weaker than the light level after only a few microseconds and the probability of two 'after glow' pulses from the two p.m. tubes to be in coincidence is negligible.

Let us now examine if this is a practical solution from the point of view of counting efficiency. According to this invention the counting system is paralyzed for, e.g., 10 msec after each interaction of a gamma photon with the NaI(Tl) crystal. Will this result in a decrease in the counting efficiency to such an extent as to make this solution impractical? The answer is: No. On the average one background gamma photon interacts with the NaI(Tl) crystal per second. Therefore, approximately, in only 10 msec out of 1 second the counting system is paralyzed; in other words: the loss in counting efficiency is only 1% and such a loss is rather insignificant. Using inhibition periods shorter than 10 msec will, of course, decrease the loss in counting efficiency to even smaller values.

It should be further realized that according to this invention not only 'after glow' pulses from the NaI(Tl) crystal originating from background gamma photons interacting with the crystal are rejected but also 'after glow' pulses due to interactions of beta particles, neutrons and other particles, are rejected.

According to this invention, an inhibition period of about 1-20 msec is to be used when a pure beta emitter is measured and particularly in tritium measurements. When a gamma sample is to be measured the inhibition circuit is disconnected. When mixtures of tritium and a gamma emitter are to be measured, the inhibition circuit is to be used only with low level samples. Background in the tritium channels will thus be low (which is important in low level counting) with only a small decrease in counting efficiency, due to the low rate of gamma photons. In the case of high-level samples, the inhibition circuit is disconnected, but then achieving low background counting rate is not very important. One can also exclude the lower part of the tritium spectrum thus discriminating also the small 'after glow' pulses most of which originate from single-photon pulses (see FIG. 3).

Not only NaI(Tl) crystals are characterized by 'after glow' emission but also other inorganic scintillation crystals, e.g.: CsI(Tl) and CsI(Na), and long inhibition periods, according to this invention, should be used with alpha-beta-gamma spectrometers which comprise such crystals.

In a preferred embodiment of this invention, there is provided a computer-controlled electronic timer which is used to inhibit pulses to enter the multichannel analyzer, the inhibition time being a function of the pulse height. When a high energy gamma photon (300 keV, for example) interacts with the NaI(Tl) crystal, the intensity of 'after glow' is higher than that which results from the interaction of a low energy gamma photon (35 keV from I-125, for example). The lower the intensity of the 'after glow ', the shorter the inhibition time needed to reduce the rate of 'after glow' pulses to an acceptable rate. The use of this preferred embodiment and 'live time' counting is especially useful in counting samples which contain mixtures of H-3 and I-125.

BRIEF DESCRIPTION OF THE DRAWINGS

The invention is illustrated by way of example only, in the accompanying drawings in which.

With specific reference now to the figures in detail it is stressed that the particulars shown are by way of example and for purposes of illustrative discussion only and are presented in the cause of providing what is believed to be a useful and readily understood description of the principles and conceptual aspects of the invention. In this regard no attempt is made to show structural details of the system and its apparatus in more detail than is necessary for a fundamental understanding of the invention the description taken with the drawings making apparent to those skilled in the art how the several forms of the invention may be embodied in practice.

Figure 1:
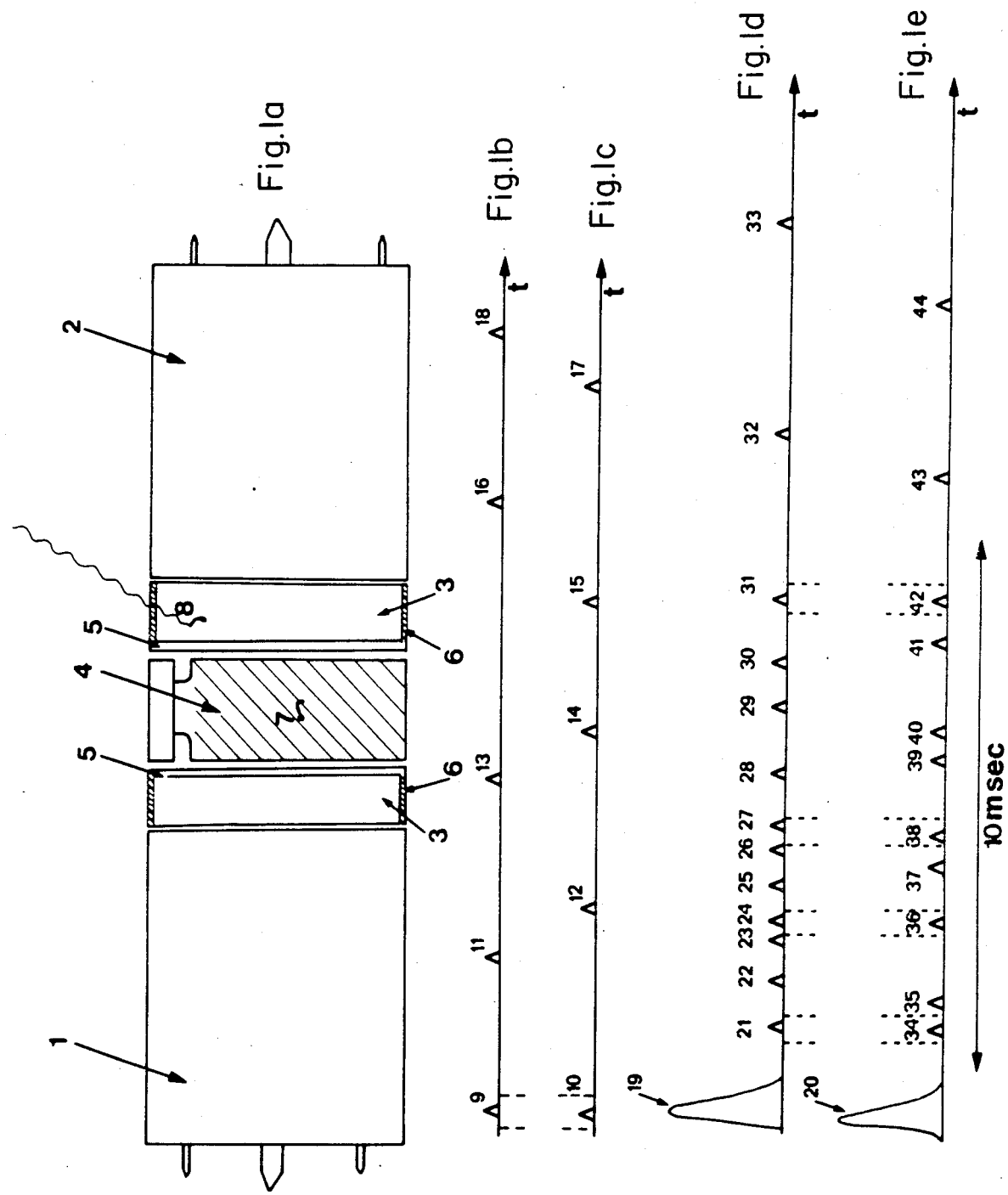
FIG. 1a is a cross-sectional view of the core of the scintillation spectrometer.
FIGS. 1b-1e are graphs by the p.m. tubes.

Referring now to FIG. 1a there is shown a NaI(Tl) crystal 3 coupled to two photomultiplier tubes, 1 and 2. The crystal is encased in an aluminium housing and a reflecting substance 6, and it has a central bore which is coated on its surface by quartz, 5. A vial, 4, containing liquid scintillator is placed in the bore. 7 depicts a beta particle, emitted from a tritium atom, interacting with the liquid scintillator. 8 depicts a background gamma photon interacting with the NaI(Tl) crystal. Referring to FIGS. 1b and 1c, 9 and 10 depict two pulses generated by the photomultiplier tubes as a result of a beta interaction, 7, with the liquid scintillator, said pulses being in coincidence. These two pulses are added and the resulting pulse is stored in the multichannel analyzer (see FIG. 2). The noise pulses 11, 13, 16 and 18 from the left p.m. tube are not in coincidence with the noise pulses 12, 14, 15 and 17 from the right p.m. tube and therefore are rejected by the fast coincidence circuit. Referring to FIGS. 1d and 1e, in tritium counting when a background gamma photon interacts with the NaI(Tl) crystal the large pulses 19 and 20 are rejected because their size is out of the tritium window and by the pulse shape analyzers 49 and 49'. Pulses 21-33 are 'after glow' pulses from the left p.m. tube and pulses 34-44 are 'after glow' pulses from the right p.m. tube. With a conventional alpha-beta-gamma spectrometer the 'after glow' pairs—21 and 34, 24 and 36, 27 and 38, 31 and 42—are in coincidence and, as a result, four background pulses in the tritium window are registered. Using monostable circuits (or electronic timers), according to this invention, which inhibit all pulses from both of the p.m. tubes for a period of 10 msec when an interaction with the NaI(Tl) is detected, the 'after glow' pulses 21-31 from the left p.m. tube and the 'after glow' pulses 34-42 from the right p.m. tube are rejected and no background counts are registered in the tritium window.

Figure 2:
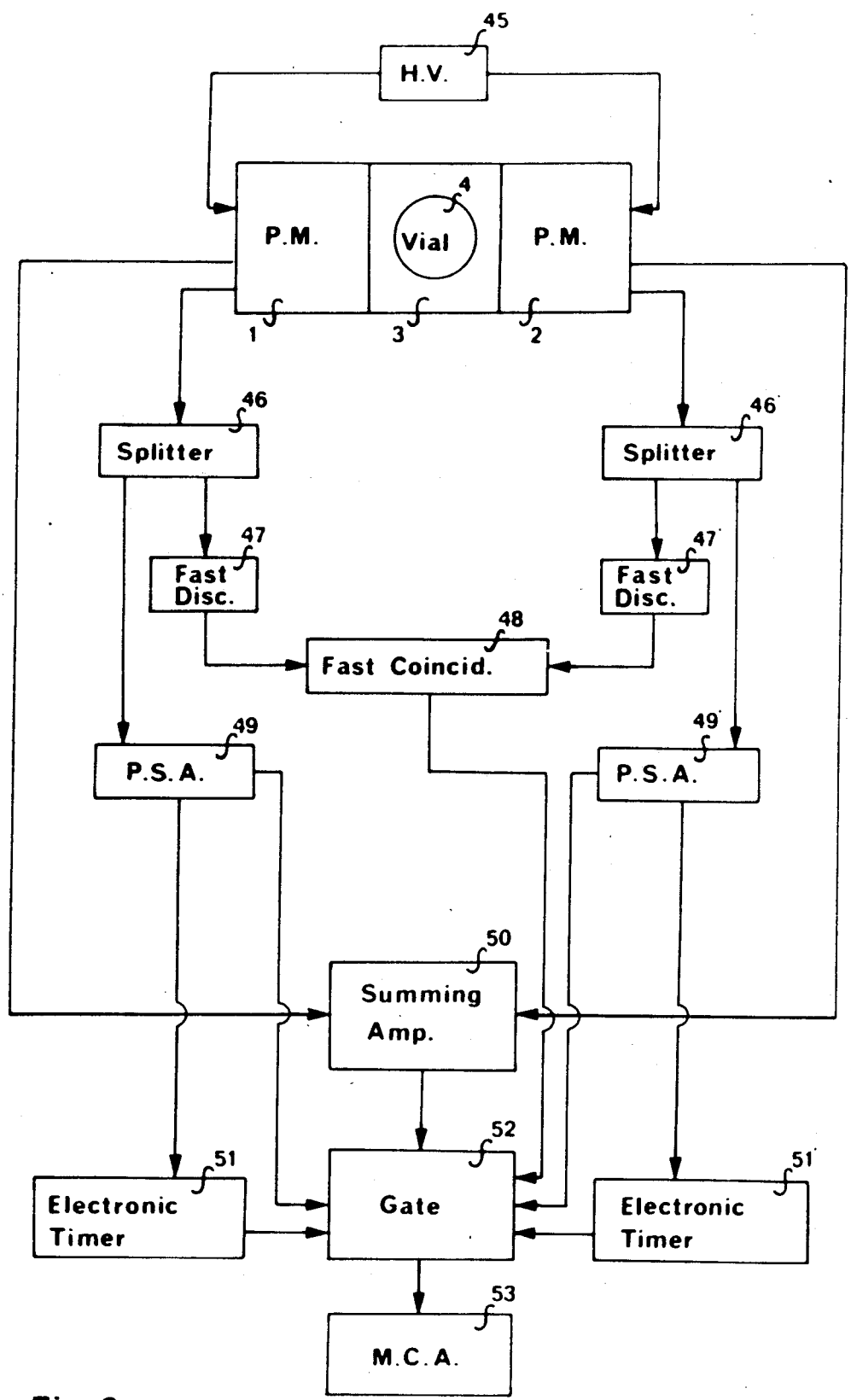
FIG. 2 is an electronic block diagram of a preferred scintillation spectrometer.

FIG. 2 illustrates an electronic block diagram of a preferred scintillation spectrometer. A high-voltage power supply 45, is connected to the two photomultiplier tubes, 1 and 2. The pulses from the anodes of said photomultiplier tubes are added by the summing amplifier, 50, and if the gate, 52, is open the added pulse is stored in the multichannel analyzer, 53. In measuring a sample containing tritium the gate to the multichannel analyzer is open only when (1) the pulses from the p.m. tubes have the right shape as determined by the pulse shape analyzers, 49 and 49' and (2) the pulses are in coincidence, as determined by the fast coincidence circuit, 48, and (3) the pulses are not 'after glow' pulses as determined by the electronic timers 51 and 51'. 46 and 46' are splitters and 47 and 47' are fast discriminators.

Figure 3:
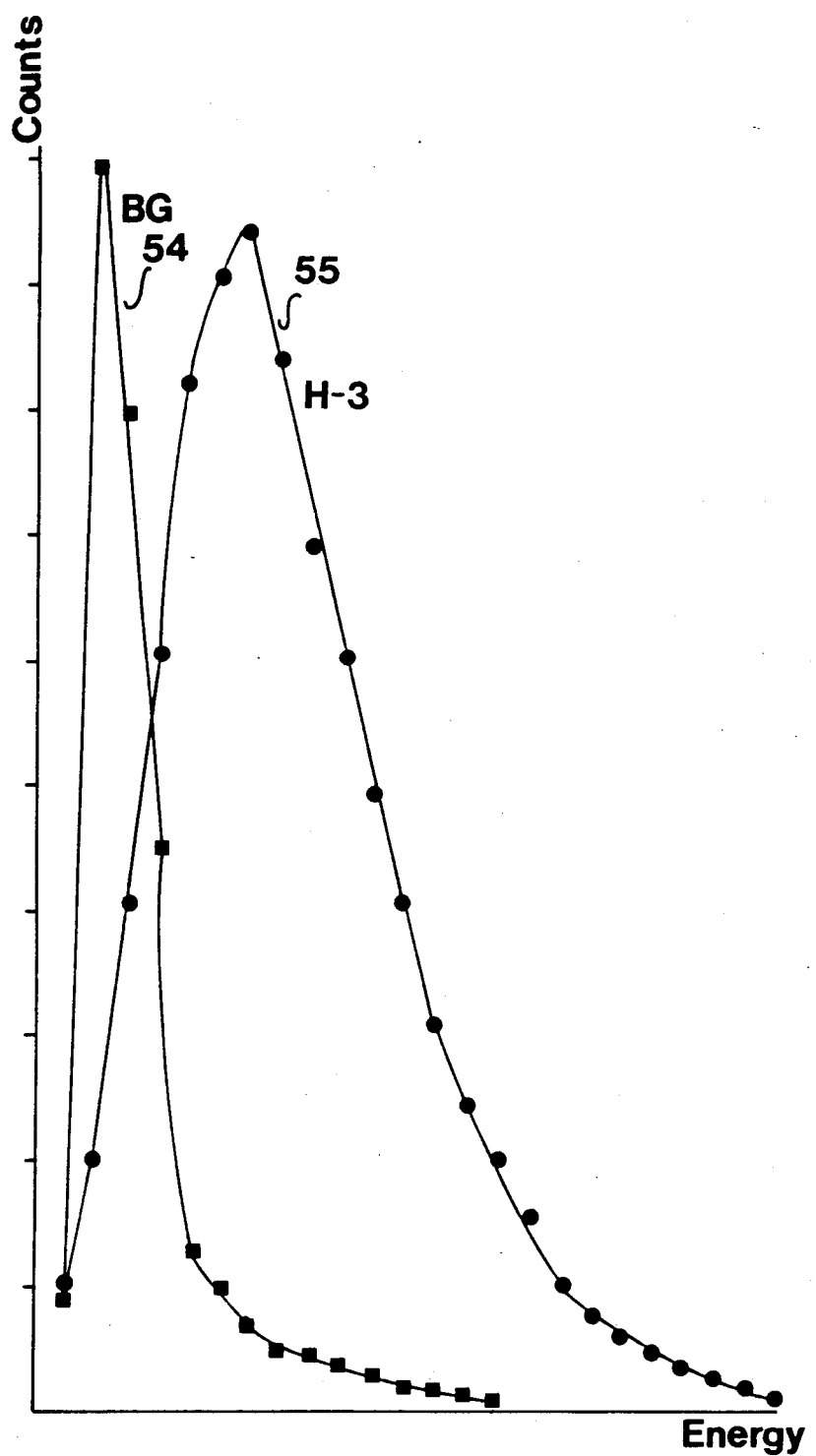
FIG. 3 shows tritium and background spectra as obtained with a conventional alpha-beta-gamma spectrometer.

FIG. 3 illustrates the spectra obtained with a background sample, 54, and with a sample containing tritium, 55, both spectra obtained with a conventional alpha-beta-gamma scintillation spectrometer.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An alpha-beta-gamma scintillation spectrometer comprising:

a scintillation crystal, two photomultiplier tubes coupled to the scintillation crystal, means for the detection of a slow pulse originating from said crystal, a multichannel analyzer for registering and storing coincident pulses from both of said photomultiplier tubes, and inhibition circuit means for inhibiting delayed light emission background pulses originating from the crystal from passing to said multi-channel analyzer of said spectrometer for a period of about 1 to about 20 msec following the detection of a slow pulse originating from said crystal.

2. An alpha-beta-gamma scintillation spectrometer according to claim 1 wherein said scintillation crystal is an NaI(Tl) crystal.

3. An alpha-beta-gamma scintillation spectrometer according to claim 1 wherein said inhibition circuit inhibits said pulses for a period of about 5 to about 15 msec.

4. A scintillation spectrometer according to claim 1 wherein said inhibition circuit is a monostable circuit.

5. A scintillation spectrometer according to claim 1 wherein said inhibition circuit comprises an electronic timer.

6. A scintillation spectrometer according to claim 1 wherein said inhibition circuit comprises a computer controlled electronic timer wherein the inhibition time after each pulse depends on its size.

7. A scintillation spectrometer according to claim 1 wherein said inhibition time is 10 milliseconds.

* * * * *